(12) United States Patent
Kim et al.

(10) Patent No.: US 7,349,502 B2
(45) Date of Patent: Mar. 25, 2008

(54) DIGITAL COMMUNICATION SYSTEM AND METHOD FOR OPERATING THE SYSTEM WHICH CAN IMPROVE EQUALIZATION PERFORMANCE ACCORDING TO CHANNEL STATE

(75) Inventors: Jung-jin Kim, Daegu (KR); Yong-sik Kwon, Seoul (KR); Jin-hee Jeong, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 750 days.

(21) Appl. No.: 10/626,706

(22) Filed: Jul. 25, 2003

(65) Prior Publication Data

US 2004/0156460 A1 Aug. 12, 2004

(30) Foreign Application Priority Data

Feb. 6, 2003 (KR) ............... 10-2003-0007591

(51) Int. Cl.
*H03D 1/04* (2006.01)
*H03D 1/24* (2006.01)
*H04N 5/44* (2006.01)

(52) U.S. Cl. ............... 375/346; 375/321; 348/725
(58) Field of Classification Search ............ 375/145, 375/149, 229, 277, 321, 343, 346, 367; 370/515; 348/725–726, 729

See application file for complete search history.

(56) References Cited

U.S. PATENT DOCUMENTS

| | | | | |
|---|---|---|---|---|
| 5,973,725 A | * | 10/1999 | Lee | ............... 348/21 |
| 6,226,049 B1 | * | 5/2001 | Oh | ............... 348/607 |
| 6,275,554 B1 | * | 8/2001 | Bouillet et al. | ............. 375/371 |
| 6,693,958 B1 | * | 2/2004 | Wang et al. | ............... 375/232 |
| 2001/0007480 A1 | * | 7/2001 | Hong et al. | ............... 348/725 |
| 2002/0009135 A1 | * | 1/2002 | Omura et al. | ............... 375/232 |
| 2002/0173286 A1 | * | 11/2002 | Lindoff et al. | ............. 455/295 |
| 2003/0223519 A1 | * | 12/2003 | Jeong et al. | ............... 375/350 |
| 2004/0213341 A1 | * | 10/2004 | Fimoff et al. | ............... 375/233 |

FOREIGN PATENT DOCUMENTS

| | | |
|---|---|---|
| JP | 10-511230 | 10/1998 |
| JP | 2000-228641 | 8/2000 |
| JP | 2002-076995 | 3/2002 |

* cited by examiner

*Primary Examiner*—Young T. Tse
(74) *Attorney, Agent, or Firm*—Sughrue Mion, PLLC

(57) ABSTRACT

A digital communication system having an improved equalization performance according to a channel state and a method for operating the system are disclosed. The digital communication system includes: a channel state judging section; and an equalizing section for compensating for a channel distortion of the inputted signal by initializing a parameter on the basis of the judged channel state. The channel state judging section includes: a channel prediction section for predicting the channel state of the inputted signal by using the field sync; an N number of buffers for storing the state information regarding the N number of channels predicted by means of the N number of the field syncs; a calculating section for calculating a difference between the state information regarding the N number of channels stored in the N number of buffers; and a judging section for judging the channel state on the basis of the calculated difference.

9 Claims, 6 Drawing Sheets

DIGITAL COMMUNICATION SYSTEM AND METHOD FOR OPERATING THE SYSTEM WHICH CAN IMPROVE EQUALIZATION PERFORMANCE ACCORDING TO CHANNEL STATE

BACKGROUND OF THE INVENTION

1. Field of the Invention

The present invention relates to a digital broadcasting system, and more particularly, to a digital broadcasting system and a method for operating the system which can improve equalization performance by judging channel states of an inputted signal by using a field sync. The present application is based on Korean Patent Application No. 2003-7591 and U.S. Provisional Application No. 60/430,086, which are incorporated herein byreference.

2. Description of the Prior Art

As generally known in the art, as means of communication, computers and broadcasting have been integrated and become multimedia, and countries all over the world have turned existing analog broadcasting into digital broadcasting. Particularly, advanced countries such as the USA, Europe and Japan are already providing digital broadcasting in part through satellites. Further, standards for digital broadcasting have been prepared, but such standards vary from country to country.

The FCC (federal communications commission) in the USA has approved a digital TV standard of ATSC (advanced television systems committee) as the next standard for TV broadcasting. In view of this approval, terrestrial broadcasters should abide by standards regarding video/audio compression, transmission structure of packet data, modulation and the transmission system provided by the ATSC standard. However, since standards for video format have not been provided particularly in the ATSC standard, the industry has come to determine them autonomously.

According to the ATSC standard, the MPEG (moving picture experts group)-2 video standard (ISO/IEC IS 13818-2) has been selected as a video compression method. All digital broadcasting all over the world use MPEG-2 as a standard. Further, digital audio compression standard (AC-3) has been selected as an audio compression method, and the MPEG-2 system standard (ISO/IEC IS 13818-1) has been selected as a multiplexing method.

FIG. 1 is a view showing a conventional construction of a data frame in ATSC. Referring to FIG. 1, an ATSC field is composed of 313 continuous segments, and an ATSC field sync is composed of one segment. An ATSC frame is composed of two ATSC fields.

FIG. 2 is a view showing an ATSC field sync. The ATSC field sync comprises a segment sync composed of four symbols, a PN (pseudo noise) sequence composed of 511 symbols, three PN sequences composed of 63 symbols, a transmission mode composed of 24 symbols, 92 symbols reserved and 12 precode symbols.

In a typical construction of an ATSC frame shown in FIG. 1 and FIG. 2, operation modes of a conventional equalizer are a training mode operated by means of LMS algorithm using a PN sequence from among the field sync inputted by a field unit and a blind mode operated by means of a blind algorithm using other data, etc.

Typically, performance of an equalizer, such as a convergence speed and convergence level, are greatly affected by the construction of the equalizer, the blind algorithm used and step sizes. Accordingly, the construction of the equalizer, the blind algorithm used, and step sizes, which have an effect on equalization performance, depend on states of static channels and dynamic channels.

However, information for channel states in received signals has not been provided to the equalizer in a conventional digital communication system. Accordingly, since the conventional digital communication system cannot properly cope with the state change of static channels and dynamic channels, the equalization performance is reduced.

SUMMARY OF THE INVENTION

Accordingly, the present invention has been made to solve the above-mentioned problems occurring in the prior art, and an object of the present invention is to provide a digital communication system and a method for operating the system which can improve equalization performance by judging channel states of an inputted signal by using N number of inputted field sync, being based on the judged state information regarding the channel.

In order to accomplish this object, there is provided a digital communication system comprising: a channel state judging section for judging channel states of an inputted signal by using a field sync of the inputted signal; and an equalizing section for compensating for a channel distortion of the inputted signal by initializing a parameter on the basis of the judged channel states.

The channel state judging section comprises: a channel prediction section for predicting the channel states of the inputted signal by using the field sync; an N number of buffers for storing the state information regarding the N number of channels predicted by means of the N number of the field sync; a calculating section for calculating a difference between the state information regarding the N number of channels stored in the N number of buffers; and a judging section for judging the channel states on the basis of the calculated difference.

Preferably, the judging section judges the channel states by means of a threshold value applied to the calculated difference.

Further, the field sync is a PN sequence.

In order to accomplish this object, there is provided a method for operating the digital communication system comprising the steps of: (1) judging channel states of an inputted signal by using a field sync of the inputted signal; and (2) compensating for a channel distortion of the inputted signal by initializing a parameter on the basis of the judged channel states.

Step 1 comprises the steps of: (a) predicting channel states of an inputted signal by using a field sync; (b) storing a state information regarding N number of channels predicted by means of N number of the field sync in N number of buffers; (c) calculating a difference between the state information regarding the N number of channels stored in the N number of buffers; (d) and judging the channel states on the basis of the calculated difference.

Preferably, the channel states are judged by means of a threshold value applied to the calculated difference in step d. Accordingly, the present invention provides a digital communication system provided with a device for judging the channel states of the inputted signal, so as to enable the judged channel state information to be transmitted to an equalizer and then to initialize an optimum parameter of the equalizer according to a dynamic channel state or static channel state, thereby enabling the system to have an improved equalization performance.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
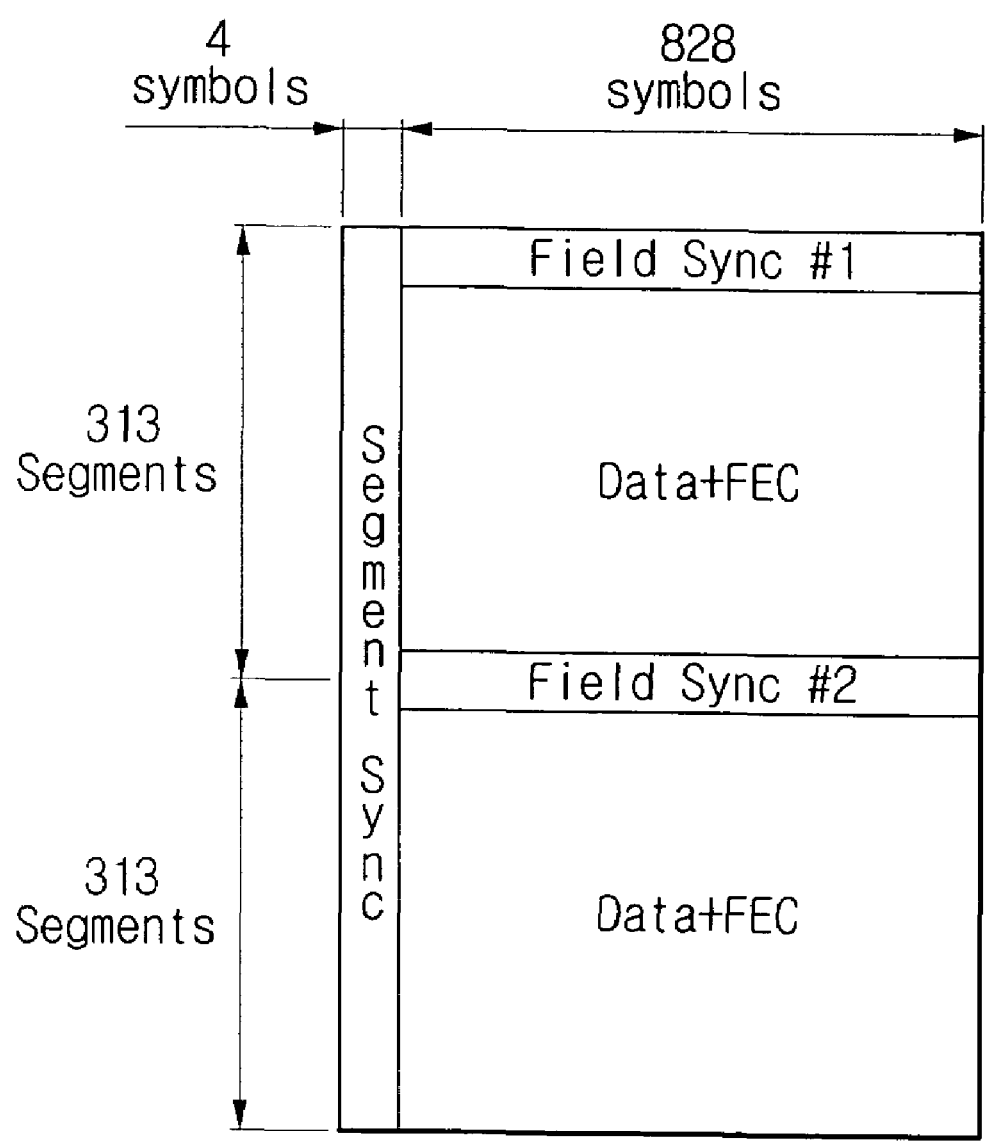
FIG. 1 is a view showing a conventional construction of a frame in ATSC.
Figure 2:
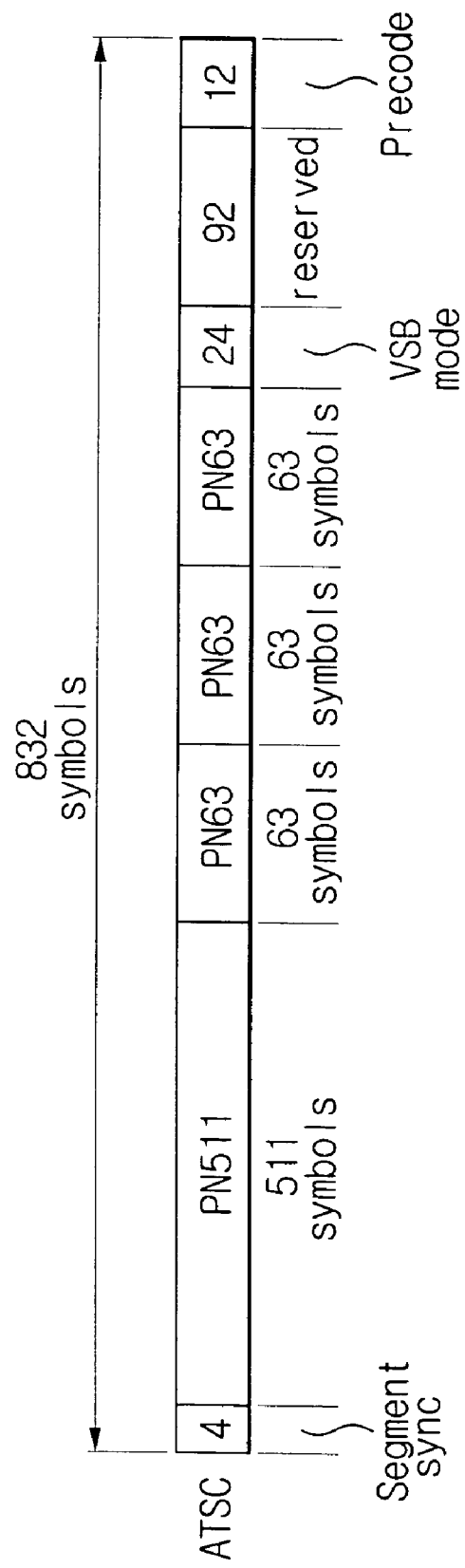
FIG. 2 is a view showing a field sync from among the construction of the frame in ATSC.
Figure 3:
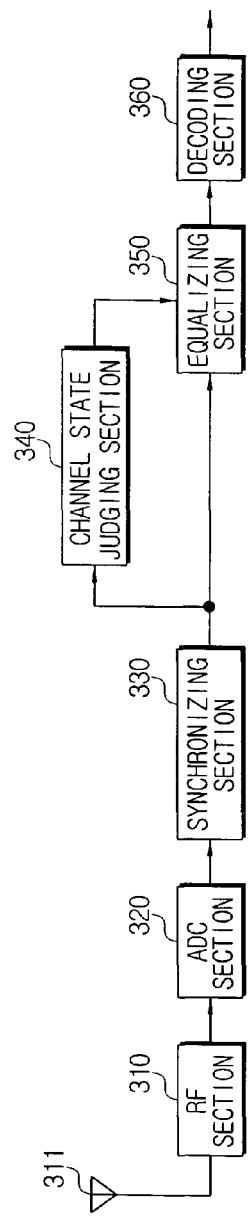
FIG. 3 is a schematic block diagram regarding a digital communication system according to the present invention.

FIG. 3 is a schematic block diagram regarding a digital communication system employing a VSB method from among methods which utilize a PN sequence as a field sync. The digital communication system includes an RF section 310, an ADC (analog to digital converter) section 320, a synchronizing section 330, a channel state judging section 340, an equalizing section 350 and a decoding section 360.

The RF section 310 tunes a signal from an antenna 311 and converts the tuned signal into a baseband signal.

The ADC section 320 converts the inputted analog signal into a digital signal through a digital sampling.

The synchronizing section 330 compensates for a frequency, a phase and a timing offset for the inputted signal.

The channel state judging section 340 judges whether a channel state of the inputted signal is a static state or a dynamic state, using a field sync between transceivers, which is a PN sequence.

The equalizing section 350 compensates for a channel distortion according to the channel states by initializing parameters of the equalizing section 350 corresponding to each of the channel states on the basis of an information regarding the channel states judged by the channel state judging section 340.

The decoding section 360 decodes a data of the signal equalized by the equalizing section 350.

Figure 4:
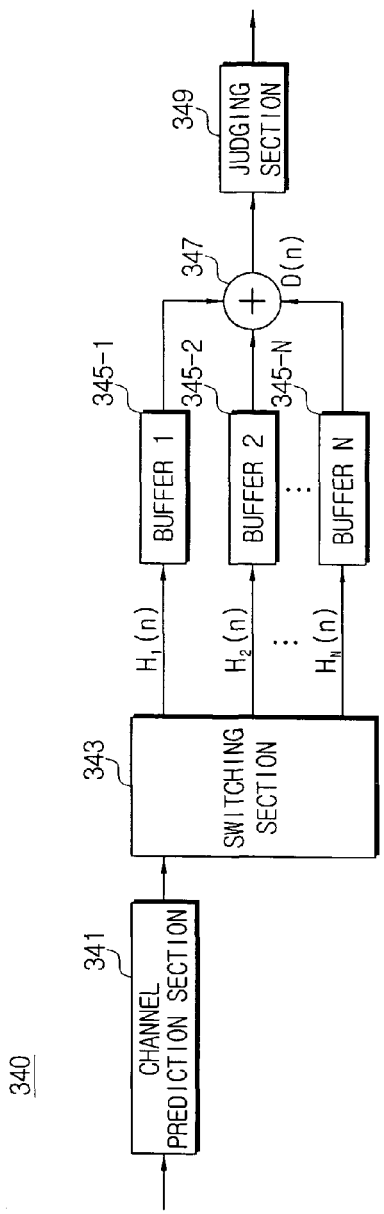
FIG. 4 is a detailed block diagram regarding a channel state judging section in FIG. 3.
Figure 5:
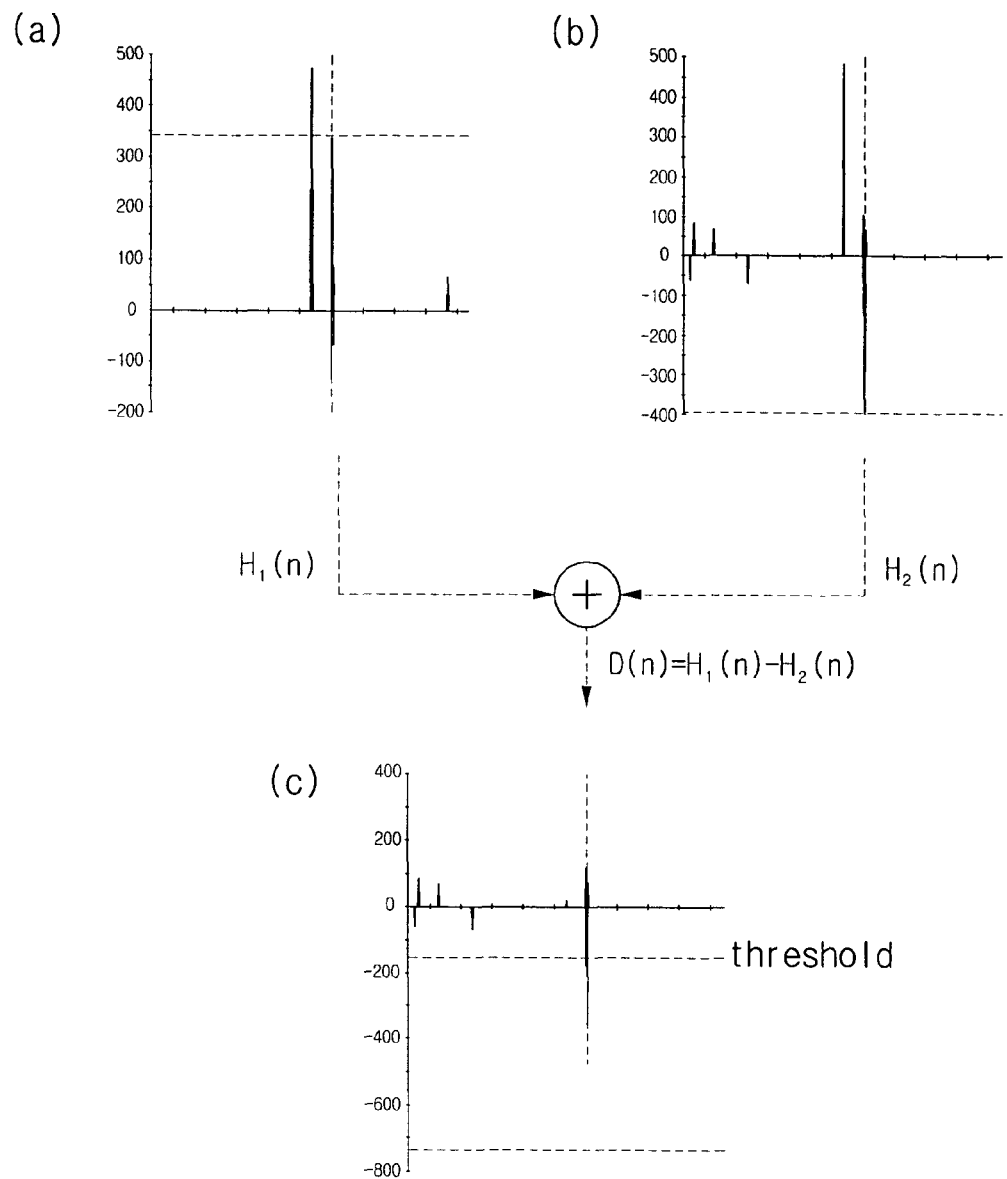
FIG. 5 is an exemplary view illustrating an operation of the channel state judging section in FIG. 3.

Hereinafter, the channel state judging section 340 in digital communication system according to the present invention is described in detail with reference to FIG. 4 and FIG. 5.

The channel state judging section 340 includes a channel prediction section 341, a switching section 343, N number of buffers 345-1~345-N, a calculating section 347 and a judging section 349. In this case, N is natural number.

The channel prediction section 341 predicts channel states of an inputted signal by means of a field sync. In this case, the channel prediction section 341 predicts the channel states of the inputted signal by using a typical method for predicting a channel such as a correlation and FFT method. That is, the channel prediction section 341 predicts the channel states of the inputted signal by using the FFT method and the correlation between a received PN sequence and a PN sequence generated in a system. For instance, the channel states predicted by means of two field syncs are shown in FIGS. 5A and 5B.

The switching section 343 performs a switching operation with respect to state information regarding N number of channels predicted by means of N number of the field sync such that the state information is stored in N number of buffers 345-1~345-N respectively. The switching section 343 performs a switching operation such that the information for predicting a channel shown in FIGS. 5A and 5B is stored in the buffer 345-1 and 345-2 respectively.

The N number of buffers 345-1~345-N store the state information regarding N number of channels predicted by the channel prediction section 341 in the N number of buffers 345-1~345-N by means of the switching operation of the switching section 343.

The calculating section 347 calculates a difference $D(n) = H_1(n) - H_2(n) - \ldots H_N(n)$ between the predicted state information regarding N number of channels stored in the N number of buffers 345-1~345-N. That is, the calculating section 347 calculates a difference $D(n) = H_1(n) - H_2(n)$ between the information for predicting the channel stored in the buffer 345-1 and 345-2 respectively, as shown in FIG. 5C.

The judging section 349 applies a threshold value having a predetermined size to the calculated difference and judges whether the calculated difference is greater than the threshold value or not. In this case, when the calculated difference is greater than the threshold value, the judging section 349 judges the channel state as the dynamic channel state. Typically, since the channel state does not change according to a time in the static channel state, the difference $D(n)$ between the predicted information regarding the channel state $H_1(n), H_2(n), \ldots H_N(n)$ is not great. Further, since the channel state changes according to a time in the dynamic channel state, the difference $D(n)$ between the predicted information regarding the channel state $H_1(n), H_2(n), \ldots H_N(n)$ is great.

As shown in FIG. 5C, when the difference $D(n)$ is greater than the threshold value, the judging section 349 judges the channel state as the dynamic channel state.

Accordingly, a difference of a channel state between two field syncs caused by a noise in the static channel state is the threshold value, when the difference $D(n)$ is less than the threshold value, the judging section 349 judges the channel state as the static channel state. Also, when the difference $D(n)$ is greater than the threshold value, the judging section 349 judges the channel state as the dynamic channel state. In this case, the number of the buffer N may be randomly determined as many as the number of the field syncs to be observed. Particularly, in case of the dynamic channel state having a small Doppler rate, since the difference of the channel state between one field sync may be small, the channel state can be more accurately judged by observing a plurality of the field syncs.

As described above, the equalizing section 350 initializes a parameter of the equalizing section 350 on the basis of the predetermined information regarding the channel states judged by the channel state judging section 340. Accordingly, the present invention can improve equalization performance, since the present invention can be operated by the blind algorithm having good performance according to each channel state.

Figure 6:
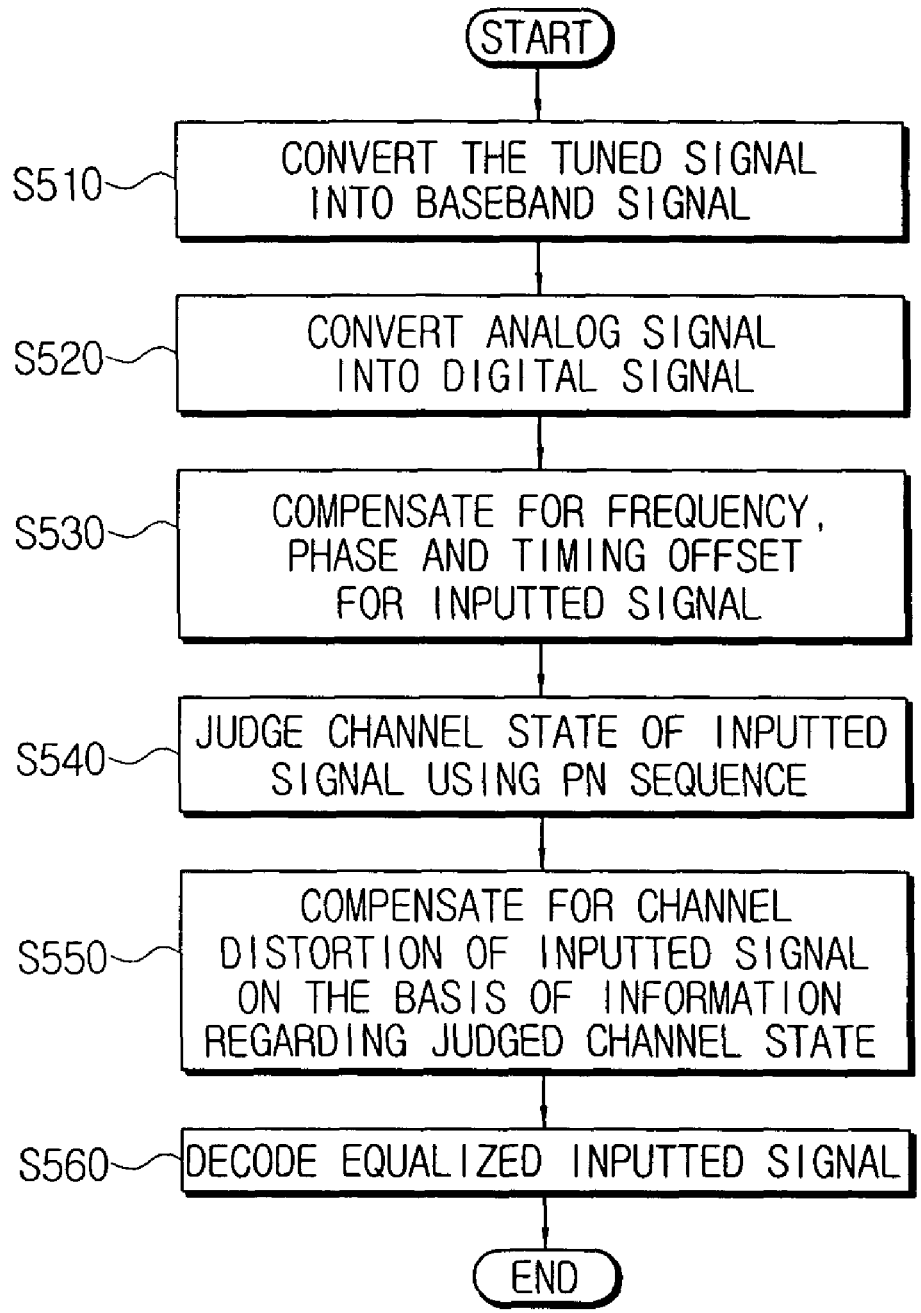
FIG. 6 is a flow chart regarding an operation method of the digital communication system in FIG. 3.

Hereinafter, an operation method of the digital communication system having an improved equalization performance according to the present invention is described with reference to FIG. 6.

The RF section 310 tunes a predetermined signal from among signals received in the antenna 311 and converts the tuned signal into a baseband signal in step S510. The ADC section 320 converts the inputted analog signal into a digital signal through a digital sampling in step S520. The synchronizing section 330 compensates for a frequency, a phase and a timing offset for the inputted signal in step S530. The channel state judging section 340 judges whether a channel state of the inputted signal is the static state or the dynamic state, using a PN sequence in step S540. The equalizing section 350 compensates for a channel distortion according to the channel state by initializing parameters corresponding to each of the channel states on the basis of information regarding the channel state judged by the channel state judging section 340 in step S550. The decoding section 360 decodes data of the signal equalized by the equalizing section 350 in step S560.

Figure 7:
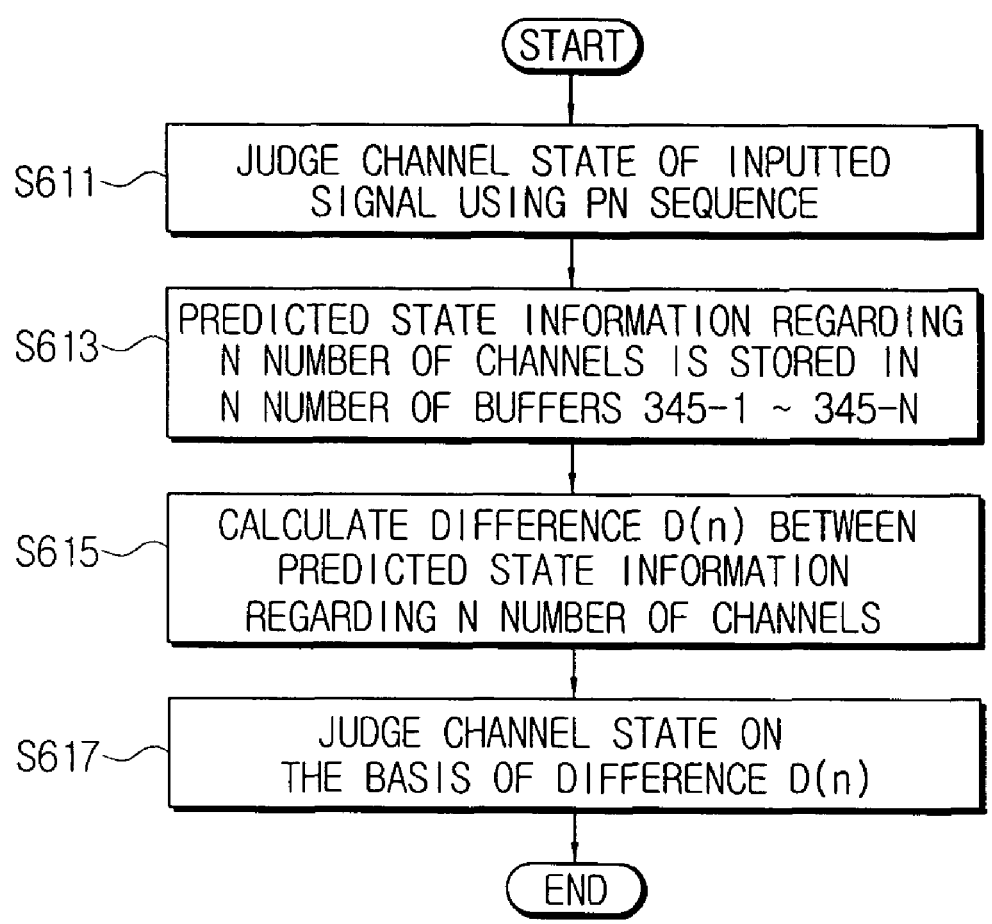
FIG. 7 is a flow chart regarding an operation method of the channel state judging section in FIG. 3.

FIG. 7 is a flow chart regarding a detailed operation method of the channel state judging section, and a method for judging channel states of an inputted signal is described with reference to FIG. 7.

The channel prediction section 341 predicts the channel states of the inputted signal by using the FFT method and the correlation between a received PN sequence and a PN sequence generated in a system in step S611. The switching section 343 performs a switching operation with respect to state information regarding N number of channels predicted by the channel prediction section 341 such that the state information is stored in N number of buffers 345-1~345-N respectively in step S613. The calculating section 347 calculates a difference $D(n)=H_1(n)-H_2(n)-\ldots H_N(n)$ between the predicted state information regarding N number of channels stored in the N number of buffers 345-1~345-N in step S615. The judging section 349 applies a threshold value having a predetermined size to the calculated difference $D(n)$ and judges whether the channel state is the dynamic channel state or the static channel state in step S617.

Accordingly, the digital communication system according to the present invention judges channel states of the inputted signal by means of the field sync inputted by the field unit, so as to initialize an optimum parameter of an equalizer according to the judged channel states, thereby enabling the system to have an improved equalization performance.

According to the present invention, the digital communication system is provided with a device for judging the channel state of the inputted signal, so as to enable the judged channel state information to be transmitted to an equalizer and then dynamic or static channel states to be initialized with an optimum parameter of the equalizer, thereby enabling the system to have an improved equalization performance.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A digital communication system comprising:
   a channel state judging section for judging channel states of an inputted signal by using field syncs of the inputted signal; and
   an equalizing section for compensating for channel distortion of the inputted signal by initializing parameters on the basis of the judged channel states,
   wherein the channel states comprise a static state and a dynamic state.

2. The digital communication system as claimed in claim 1, wherein each field sync is a PN sequence.

3. A digital communication system comprising:
   a channel state judging section for judging a channel state of an inputted signal by using a field sync of the inputted signal; and
   an equalizing section for compensating for a channel distortion of the inputted signal by initializing a parameter on the basis of the judged channel state,
   wherein the channel state judging section comprises:
   a channel prediction section for predicting the channel state of the inputted signal by means of the field sync;
   a plurality of buffers for storing state information regarding a plurality of channels predicted by means of a plurality of field syncs;
   a calculating section for calculating a difference between the state information regarding N number of channels among the plurality of channels stored in N number of buffers among the plurality of buffers, wherein N is a natural number; and
   a judging section for judging the channel state on the basis of the calculated difference.

4. The digital communication system as claimed in claim 3, wherein the judging section judges the channel state by means of a threshold value applied to the calculated difference.

5. The digital communication system as claimed in claim 3, wherein N equals a number of the plurality of field syncs.

6. An operation method in a digital communication system, the method comprising the steps of:
   (1) judging channel states of an inputted signal by means of field syncs of the inputted signal; and
   (2) compensating for channel distortion of the inputted signal by initializing parameters on the basis of the judged channel states,
   wherein the channel states comprise a static state and a dynamic state.

7. The method as claimed in claim 6, wherein each field sync is a PN sequence.

8. An operation method in a digital communication system, the method comprising the steps of:
   (1) judging a channel state of an inputted signal by means of a field sync of the inputted signal; and
   (2) compensating for a channel distortion of the inputted signal by initializing a parameter on the basis of the judged channel state,
   wherein step (1) comprises the steps of:
   (a) predicting the channel state of the inputted signal by means of the field sync;
   (b) storing state information regarding N number of channels predicted by means of N number of field syncs in N number of buffers, wherein N is a natural number;
   (c) calculating a difference between the state information regarding the N number of channels stored in the N number of buffers; and
   (d) judging the channel state on the basis of the calculated difference.

9. The method as claimed in claim 8, wherein, in step (d), the channel state is judged by means of a threshold value applied to the calculated difference.

* * * * *